(12) United States Patent
Slack et al.

(10) Patent No.: US 8,189,267 B2
(45) Date of Patent: May 29, 2012

(54) ELECTROWETTING DISPLAY DEVICE

(75) Inventors: Anthony John Slack, Lorgues (FR); Roy VanDijk, Eindhoven (NL)

(73) Assignee: Samsung LCD Netherlands R&D Center B.V., Eindhoven (NL)

(*) Notice: Subject to any disclaimer, the term of this patent is extended or adjusted under 35 U.S.C. 154(b) by 0 days.

(21) Appl. No.: 12/977,365

(22) Filed: Dec. 23, 2010

(65) Prior Publication Data

US 2011/0194168 A1    Aug. 11, 2011

Related U.S. Application Data

(63) Continuation of application No. PCT/EP2009/057885, filed on Jun. 24, 2009.

(30) Foreign Application Priority Data

Jun. 27, 2008   (GB) ................... 0811811.9

(51) Int. Cl.
   *G02B 3/12*    (2006.01)
   *G02B 1/06*    (2006.01)

(52) U.S. Cl. .............................. 359/665; 359/666

(58) Field of Classification Search ............ 359/665, 359/666

See application file for complete search history.

(56) References Cited

U.S. PATENT DOCUMENTS

| | | | |
|---|---|---|---|
| 5,536,950 | A | 7/1996 | Liu et al. |
| 5,956,005 | A | 9/1999 | Sheridon |
| 6,522,375 | B1 | 2/2003 | Jang et al. |
| 6,768,522 | B2 | 7/2004 | Yasukawa et al. |
| 6,999,140 | B2 | 2/2006 | Tanaka et al. |
| 2004/0021816 | A1 | 2/2004 | Jeong et al. |
| 2006/0285067 | A1 | 12/2006 | Kim |

FOREIGN PATENT DOCUMENTS

| | | |
|---|---|---|
| WO | 03/071346 | 8/2003 |
| WO | 2004/068208 A | 8/2004 |
| WO | 2005/033782 | 4/2005 |
| WO | 2007/004130 | 1/2007 |
| WO | 2007/050333 | 5/2007 |
| WO | 2008/059040 A | 5/2008 |

*Primary Examiner* — William Choi
(74) *Attorney, Agent, or Firm* — BainwoodHuang

(57) ABSTRACT

The display device comprises a plurality of electrowetting elements. Each element comprises walls on a support plate for confining a first fluid to the space of the element. The walls of the electrowetting element cover a wall region of the support plate and the walls enclose a display region of the support plate. Each electrowetting element comprises an electrode arranged on the support plate, the electrodes of the electrowetting elements being coupled to reflective, strip-shaped signal lines, also arranged on the support plate. A first area of the signal lines is arranged in the wall region and a second area of the signal lines is arranged in the display region, where the first area is smaller than the second area.

15 Claims, 2 Drawing Sheets

ELECTROWETTING DISPLAY DEVICE

CROSS REFERENCE TO RELATED APPLICATIONS

This application is a continuation of International Patent Application No. PCT/EP2009/057885 filed on Jun. 24, 2009 and entitled "ELECTROWETTING DISPLAY DEVICE" which claims priority to GB0811811.9 filed Jun. 27, 2008, the contents and teachings of which are hereby incorporated by reference in their entirety.

FIELD OF THE INVENTION

The present invention relates to an electrowetting display device.

BACKGROUND OF THE INVENTION

A known electrowetting display device comprises a plurality of electrowetting elements. Each electrowetting element includes a first fluid and a second fluid within a space between a first and second support plate. The first fluid is confined to a display region of the electrowetting element by walls arranged on the second support plate. The walls are made of a transparent material. The configuration of the first and second fluid can be changed between a coloured or dark state and a light state by changing a voltage applied to an electrode arranged on the second support plate. The electrodes of the electrowetting elements are coupled to signal lines, also arranged on the second support plate. The signal lines are positioned under the walls.

A disadvantage of the known display device is its relatively low contrast.

It is an object of the invention to provide a display device having an improved contrast.

SUMMARY OF THE INVENTION

In accordance with the present invention, there is provided a display device comprising a plurality of electrowetting elements having a first support plate and a second support plate, each electrowetting element comprising a space between the first support plate and the second support plate and including a first fluid and a second fluid immiscible with each other, each electrowetting element comprising walls arranged on the second support plate for confining the first fluid to the space of the electrowetting element, the walls of the electrowetting element covering a wall region of the second support plate and the walls enclosing a display region of the second support plate, each electrowetting element comprising an electrode arranged on the second support plate, the electrodes of the electrowetting elements being coupled to reflective, strip-shaped signal lines arranged on the second support plate, wherein a first area of the signal lines is arranged in the wall region and a second area of the signal lines is arranged in the display region, the first area being smaller than the second area.

The invention resides in the insight that the relatively low contrast of known display devices is caused by a relatively large amount of external light reflected by the display device. The low contrast is especially noticeable when the elements of the display device are in a dark state, in particular when the display device is of the reflective type. When the elements are in a light state, the reflected light causes undesirable changes in colour for colour display devices and undesirable changes in grey level.

The relatively high reflection of the known display device for incident light is caused by the transmission of light through the walls and reflection on the signal lines arranged under the walls. This reflection is particularly relevant for a reflective display, where the amount of reflected ambient light in the dark state of the elements should be as low as possible. The common materials used for making the walls are transparent or semi-transparent. Moreover, at least some of the signal lines are usually made of metal to provide a high electrical conductivity for controlling the electrowetting elements. The transparent or semi-transparent walls and the underlying metallic signal lines cause the disadvantageous reflection of incident light.

The invention reduces the reflection by arranging the signal lines for a major part in the display regions of the second support plate, i.e. regions not covered by the walls. Preferably, a signal line lies in the wall region only where it crosses a wall region from one electrowetting element to a neighbouring one.

Light incident on a wall region of the display device according to the invention is transmitted into the second support plate, where most of the light will be lost due to absorption and/or transmission through the rear side of the second support plate and/or reflection in a direction not directly back to the viewer. Since only a relatively small amount of the light incident through the wall region will be reflected back to the viewing side of the display device, the contrast ratio for the electrowetting element according to the invention will be higher than for known electrowetting elements.

The incident light may be ambient light. When the first support plate of the display faces a viewing side of the display device and the second support plate faces a rear side of the display device, the ambient light may be incident from the viewing side.

A signal line may be directly connected to an electrode, but it may also be coupled to an electrode through an electronic circuit, e.g. an electronic switch.

It should be noted that LCD display devices are known, wherein an electrode is arranged in the display element and the signal lines are buried under the electrode. However, in mainstream LCD display devices the signal lines are arranged between the electrodes. The position of the signal lines under the electrode allows a reduction of the distance between the electrodes and thereby an increase of the aperture ratio or display region of the elements of a reflective display. In contrast, the distance between the display regions of electrowetting elements is primarily determined by the dimensions of the wall of the elements and not by the dimensions of signal lines between the electrodes. LCD display devices do not have walls to confine fluids to a single element.

In a special embodiment of the display device the electrode is arranged in the display region.

This avoids that part of the electrode, which is usually reflective, is positioned in the wall region and could cause an increased reflection of incident light in the wall region, independent of the state of the electrowetting element.

Advantageously, the second area of the signal lines is substantially in an area of the second support plate where the electrode is arranged. This allows the electrode to extend over a large part of the display area or the entire display area, which freedom can be used to optimise the shape of the electrode for switching the first fluid between the on- and off-state. In this configuration the electrode is separated from the signal lines by adding a dielectric layer between the electrode and the signal lines. The dielectric layer typically results in a top surface of the stack of layers on the second support plate that has less profile than for the case of electrowetting elements where the electrode lies between the signal lines. The reduced profile provides advantages for an electrowetting element, as it results in easier manufacturing of a reliable dielectric coating and in easier and more reproducible motion of the first fluid within the element.

In a specific embodiment of the display device a reflector is arranged in the display region.

The electrode operates preferably as reflector, which avoids the cost of arranging a separate reflector in a display device of the reflective type.

Preferably, the second area of the signal lines is arranged substantially in an area of the second support plate where the first fluid is contracted in a fluid configuration having an applied voltage.

The position of the signal lines under the position where the first fluid contracts avoids that the signal lines interfere with the transmission of light from the rear side to the viewing side of the display device for a transflective display device, and increases the area of transmission of light for a transmissive display device. The positioning the signal lines under the electrode and/or under the area where the first fluid contracts optimizes the reflective mode of operation in particular, improving the contrast-ratio for the transflective type of display.

The first area is preferably smaller than 0.2 times the second area.

A small first area will provide a larger display region at the same resolution resulting in a higher brightness. Keeping the brightness constant, a small first area allows a reduction of the size of the display region and as such an increase of the display resolution.

In an advantageous embodiment of the display device an absorbing layer is arranged on the second support plate at least in the wall region at the side of the support plate opposite the walls. The absorbing layer will absorb incident light transmitted through the walls, thereby avoiding that the light will be reflected back through the walls to the viewing side of the display device.

A further plate may be arranged at the rear side of the second support plate, which further plate is an absorber for light transmitted through the second support plate.

The absorber prevents light transmitted from the viewing side through the second support plate from reflecting back to the viewing side of the display device. The further plate may be a casing of the display device. The casing may be made of light absorbing material. Alternatively, an absorbing layer may be arranged on the casing.

In another advantageous embodiment of the display device a reflecting layer is arranged at a side of the second support plate opposite the walls, for reflecting light transmitted through the walls in a direction away from a direction of incidence of the light. When the reflecting layer reflects the light in a direction away from the viewer, it makes the walls appear black and hence improves the contrast-ratio of the display device.

In a preferred embodiment of the display device a layer in contact with the first fluid is arranged on the second support plate in at least part of the display region of the second support plate, the layer being more wettable to the first fluid than to the second fluid.

The layer may be restricted to part of the display region or cover the entire display region. For ease of manufacture, the layer may cover the entire second support plate and thereby extend under the walls. When the second fluid is substantially water, the layer is hydrophobic, and may be made of the material AF1600.

In a special embodiment the signal lines may include gate lines and source lines. The gate lines and source lines are used for controlling the state of the electrowetting elements. The display device may also be of the passive type. The display device may be of an active matrix type, which may advantageously use gate lines and source lines.

A further aspect of the invention relates to a display apparatus including a display device according to the invention.

Further features and advantages of the invention will become apparent from the following description of preferred embodiments of the invention, given by way of example only, which is made with reference to the accompanying drawings.

DETAILED DESCRIPTION OF THE INVENTION

Figure 1:
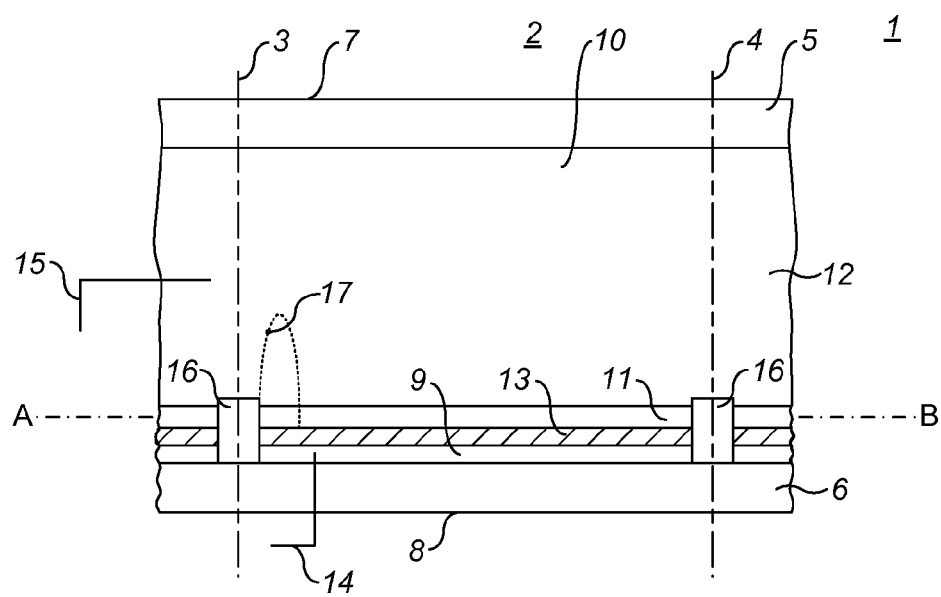
FIG. 1 shows diagrammatically a cross-section of a part of an embodiment of an electrowetting display device.

FIG. 1 shows a diagrammatic cross-section of an embodiment of an electrowetting display device 1. The display device includes a plurality of electrowetting elements 2, one of which is shown in the Figure. The lateral extent of the element is indicated in the Figure by two dashed lines 3, 4. The electrowetting elements comprise a first support plate 5 and a second support plate 6. The support plates may be separate parts of each electrowetting element, but the support plates are preferably shared in common by the plurality of electrowetting elements. The support plates may be made for instance of glass or polymer and may be rigid or flexible.

The display device has a viewing side 7 on which an image or display formed by the display device can be viewed and a rear side 8. The first support plate 5 faces the viewing side; the second support plate 6 faces the rear side 8. The display device may be of the reflective, transmissive or transflective type. The display may be a segmented display type in which the image is built up of segments. The segments can be switched simultaneously or separately. Each segment includes one electrowetting element 2 or a number of electrowetting elements 2 that may be neighbouring or distant. The electrowetting elements included in one segment are switched simultaneously. The display device may also be an active matrix driven display type or a passive matrix driven display.

A space 10 between the support plates is filled with two fluids: a first fluid 11 and a second fluid 12. The second fluid is immiscible with the first fluid. The second fluid is electrically conductive or polar, and may be water or a salt solution such as a solution of potassium chloride in a mixture of water and ethyl alcohol. The second fluid is preferably transparent, but may be coloured, white, absorbing or reflecting. The first fluid is electrically non-conductive and may for instance be an alkane like hexadecane or (silicone) oil. A hydrophobic layer 13 is arranged on the support plate 6, creating an electrowetting surface area facing the space 10. The layer may be an uninterrupted layer extending over a plurality of electrowetting elements 2 or it may be an interrupted layer, each part extending only over one electrowetting element 2, as shown in the Figure. The layer may be for instance an amorphous fluoropolymer layer such as AF1600 or another low surface energy polymer. The hydrophobic character causes the first fluid to adhere preferentially to the second support plate 6, since the first fluid has a higher wettability with respect to the surface of the hydrophobic layer 13 than the second fluid.

Wettability relates to the relative affinity of a fluid for the surface of a solid. Wettability increases with increasing affinity, and it can be measured by the contact angle formed between the fluid and the solid and measured internal to the fluid of interest. This increases from relative non-wettability at an angle more than 90° to complete wettability when the contact angle is 0°, in which case the fluid tends to form a film or layer on the surface of the solid.

Each element 2 includes an electrode 9 arranged on the second support plate 6. The electrode 9 is separated from the fluids by an insulator, which may be the hydrophobic layer 13. In general, the electrode 9 can be of any desired shape or form. The electrode 9 is supplied with voltage signals by a signal line 14, schematically indicated in the Figure. A second signal line 15 is connected to an electrode which is in contact with the conductive second fluid 11. This electrode may be common to all elements, when they are fluidly interconnected by and share the second fluid, uninterrupted by walls. The electrowetting elements 2 can be controlled by a voltage $V_e$ applied between the signal lines 14 and 15. The electrodes 9 on the support plate 6 each are coupled to a display driving system. In a display device having the elements arranged in a matrix form, the electrodes can be coupled to a matrix of printed signal lines on the second support plate.

The first fluid 11 is confined to one electrowetting element by walls 16 that follow the cross-section of the electrowetting element in the plane A-B. Although the walls are shown as structures protruding from the second support plate, they may also be a surface layer on the second support plate that repels the first fluid, such as a hydrophilic layer. The walls may extend from the second to the first support plate.

Further details of the electrowetting elements of the display are disclosed amongst others in international patent application WO 03071346. The extent of the element, indicated by the dashed lines 3 and 4, is defined by the centre of the walls 16.

The first fluid absorbs at least a part of the optical spectrum. The fluid may be transmissive for a part of the optical spectrum, forming a colour filter. For this purpose the fluid may be coloured by addition of pigment particles or dye. Alternatively, the first fluid may be black, i.e. absorb substantially all parts of the optical spectrum, or reflecting. The hydrophobic layer may be transparent or reflective. A reflective layer may reflect the entire visible spectrum, making the layer appear white, or part of it, making it have a colour.

When the voltage $V_e$ applied between the signal lines 14 and 15 is set at a non-zero active signal level $V_a$, the element will enter into an on-state. Electrostatic forces will move the second fluid 12 towards the segment electrode 9, thereby repelling the first fluid 11 from at least part of the area of the hydrophobic layer 13 towards the walls 16 surrounding the area of the hydrophobic layer. When completely repelled, the first fluid may take a drop-like form as schematically indicated by a dashed line 17. This action uncovers the first fluid from the surface of the hydrophobic layer 13 of the electrowetting element. When the voltage across the element is returned to an in-active signal level of zero or a value near to zero, the element will return to an off-state, where the first fluid flows back to cover the hydrophobic layer 13. In this way the first fluid forms an electrically controllable optical switch in each electrowetting element.

Figure 2:
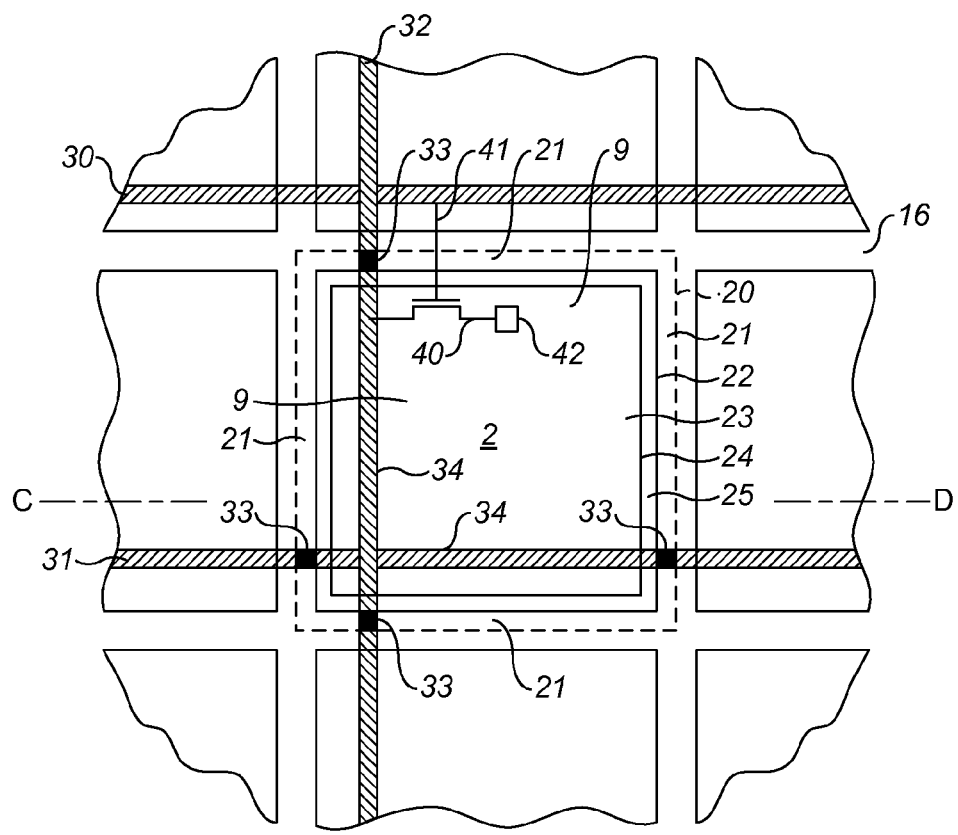
FIGS. 2, 3, 4 and 5 show a cross-section of an electrowetting element.

FIG. 2 shows a cross-section of part of the display device along the line A-B as viewed from the space 10 onto the second support plate 6. The Figure shows element 2 and part of the eight neighbouring elements. The Figure provides details mainly for element 2 for sake of clarity.

The extent of the element 2 is indicated in FIG. 2 by a dashed line 20, following the centre of the walls 16 around the element. The part of the walls 16 within the element 2, i.e. within the dashed line 20, cover a so-called wall region 21 of the support plate. The wall region 21 in FIG. 2 has the shape of a strip with a rectangular form. The area of the support plate enclosed by the walls, i.e. within an inner periphery 22 of the walls 16, is a so-called display region 23. The first fluid 11 of element 2 in FIG. 1 is confined to the display region 23. By changing the configuration of the first fluid 11 within the display region 23 by changing a voltage applied to the element, a display effect is created within the display region. In contrast, the wall region does not show a display effect.

The extent of the electrode 9 is indicated by a rectangle 24. In the embodiment of the Figure the electrode is arranged in the display region 23 and does not adjoin the walls 16, but is separated there from by an area 25. Alternatively, the electrode 9 may adjoin the walls 16.

FIG. 2 shows three signals lines 30, 31 and 32 relevant for element 2. The signals lines for all elements in the Figure form a matrix of signal lines. The signal lines 30 and 31 are gate lines and the signal line 32 is a source line. The signal lines may be connected to driver stages for controlling the display states of the elements in a known way.

The signals lines are strip-shaped and made of metals like copper, aluminium or molybdenum. The area of the signal lines of element 2 arranged in the wall region 21 is indicated as solid black areas labelled 33. The four areas 33 together form a first area. The area of the signal lines arranged in the display region 23 are labelled 34. The two areas 34 form together a second area. The first area is smaller than the second area according to the invention. In the embodiment shown, the second area 34 is substantially in an area where the electrode 9 is arranged. The first area is usually larger than zero, because the signal lines cross wall regions.

In a specific embodiment the signal lines have a width of 6 micrometer, the size of the display region is 140 micrometer by 140 micrometer and the width of the walls is 10 micrometer. The first area for element 2 in FIG. 2 is now 4×6×5=120 micrometer$^2$. The second area is 2×6×140−36=1644 micrometer$^2$. Hence, the first area is smaller than the second area, the first area being 0.07 times the second area.

The source and gate lines can be made of different materials having different reflectivity. For example, molybdenum has a reflectivity of about 50%, copper around 50 to 60% and aluminium above 90%; each of these reflectivities shows a dependence of wavelength throughout the visible spectrum. In that case, the first and second area should be corrected for the different reflectivities, e.g. multiplying each area with the reflectivity of the signal line and comparing the two products instead of the two areas. When the reflectivity of the gate lines 30, 31 is relatively low, the areas of the source line 32 need only be considered. The first area for the source line 32 is 2×6×5=60 micrometer$^2$; the second area is 6×140=840 micrometer$^2$. In that case, the first area is 0.07 times the second area. To minimize the first area, the signal lines 30, 31, 32 preferably cross the walls 16 perpendicularly, as shown in FIG. 2.

In an alternative embodiment of an element, the size of the electrode 9 may be smaller than shown in FIG. 2, such that it fits within the part of the display area 23 between the signal lines 32, 34 and the top and right-hand side of the walls 16. This reduces the number of layers to be arranged on the second support plate. The signal lines will also contribute to the reflection of the element when the element is in the on-state.

The signal lines 30, 31, 32 are coupled to the electrode 9. A signal line may be directly connected to an electrode, as in a direct drive display or a passive matrix display. Alternatively, a signal line may be coupled to an electrode through an electronic circuit, as shown in FIG. 2, where the source line 32 is coupled to the electrode 9 through an electronic switch in the form of a field transistor 40. The gate 41 of the transistor is connected to the gate line 30. Alternatively, the gate 41 may be connected to the gate line 31. The square 42 indicates a connection of the transistor with the electrode. The transistor may be arranged in an area of the display region 23 not covered by the electrode 9.

Figure 3:
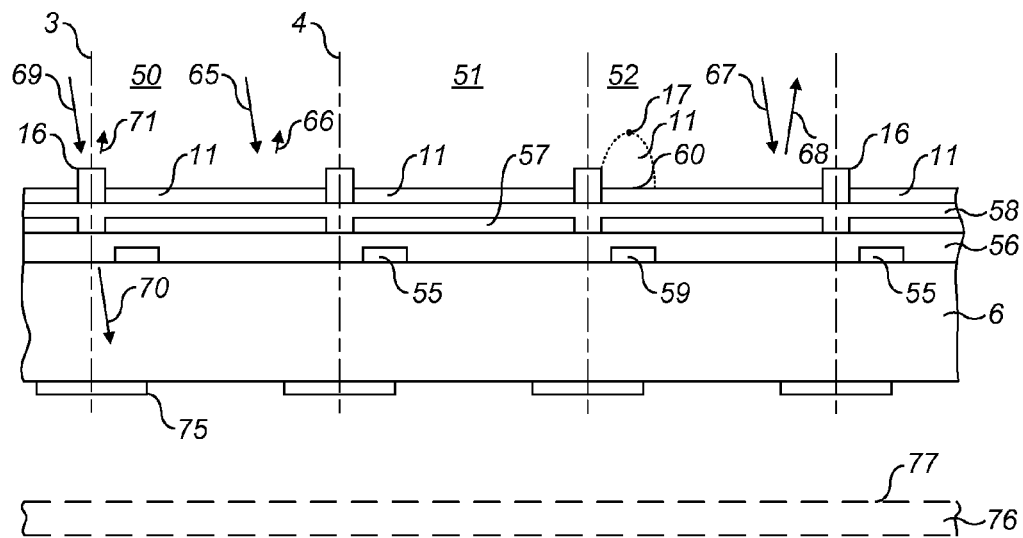

FIG. 3 shows a cross-section along the line C-D in FIG. 2. The Figure shows a series of electrowetting elements 50, 51, 52, similar to FIG. 1, but providing details of the signal lines. FIG. 3 shows several states of the elements of the display device. Elements 50 and 51 are in an off-state, where no voltage or a low voltage is applied to the element and the first fluid 11 forms a layer on the second support plate. Element 52 is in an on-state, where a voltage of the active level is applied to the element and the first fluid is contracted, as shown by line 17. The signal lines 55 are arranged on the second support plate 6. The signal lines are covered by a dielectric material 56, e.g. silicon dioxide, silicon nitride or any acrylate, BCB (benzocyclobutene) or similar materials. BCB is particularly suitable as a planarisation layer. An electrode 57 is arranged on the dielectric layer 56 within an element. The electrodes are covered by a hydrophobic layer 58. The walls 16 are arranged on the hydrophobic layer. Signal line 59 is arranged in an area 60 of the second support plate 6 where the first fluid 11 is contracted when a voltage is applied to the element 52.

The display device may be of a reflective type. For this type of display device the electrode 9, 57 may act as reflector. Alternatively, a separate reflector may be arranged in the display region of each element. The first fluid 11 is commonly a light absorbing fluid. Light 65 incident on the element 50, which is drawn in the off-state, will largely be absorbed by the layer of first fluid 11; only a small part 66 will be reflected back to the viewing side 7 of the display device. Light 67 incident on the element 52, which is shown in the on-state, will mostly be reflected by the electrode/reflector as light 68. Light 69 incident on a wall 16 will mostly be transmitted through the transparent or semi-transparent wall as light 70 into the second support plate. A very small amount of light will be reflected as light 71, causing a reduction of contrast of an image produced by the display device.

The light 70 transmitted through the walls 16 into the second support plate 6 is absorbed by an absorbing layer 75 arranged in the wall region of the second support plate as shown in FIG. 3. Alternatively, the absorbing layer 75 may cover at least the area of the second support plate on which the elements are arranged. The transmitted light 70 may also be absorbed by a further plate 76 being absorbing on a side 77 facing the second support plate. The further plate may be part of a casing of the display device.

The light 70 may also be reflected by a reflecting layer arranged at the rear side of the second support plate in a direction away from a direction of incidence of the light. The reflecting layer may be arranged on the second support plate or at the further plate. The reflecting layer may have a sawtooth shape.

Figure 4:
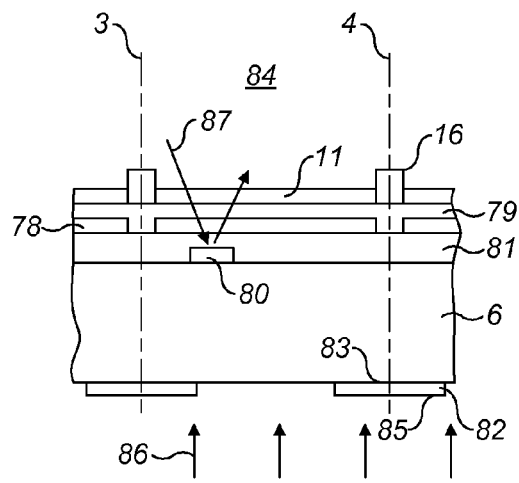

The display device may also be of a transmissive or transflective type. FIG. 4 shows a cross-section of an electrowetting element of a transmissive display device. A transparent electrode 78, made for instance of ITO, is covered by a dielectric layer 79. A signal line 80 is arranged under the electrode 78, separated from it by a dielectric layer 81. A layer 82 is arranged in the wall region of the second support plate 6. A side 83 of the layer 82 facing the support plate is light absorbing to prevent light transmitted through the walls from being reflected back to the viewing side 84 of the display device. A side 85 of the layer 82, facing away from the support plate, is reflective to improve recycling of light 86 used for back illumination of the display device. The light 86 is emitted by a back light unit arranged at the rear side of the second support plate and not shown in the Figure. Similarly, the signal line 80 recycles light by reflecting the light 86 down. For this purpose the signal line may be arranged more centrally in the display region 23, which is shown in FIG. 2. The signal line will reflect ambient light 87 back to the viewing side 84 when the first fluid 11 is in the contracted state. The signal line 80 may also be arranged in an area of the second support plate where the first fluid is contracted in a fluid configuration having an applied voltage. The image of the display device is formed by transmission of the light 86 through the electrowetting elements in dependence on the state of the first fluid 11.

Figure 5:
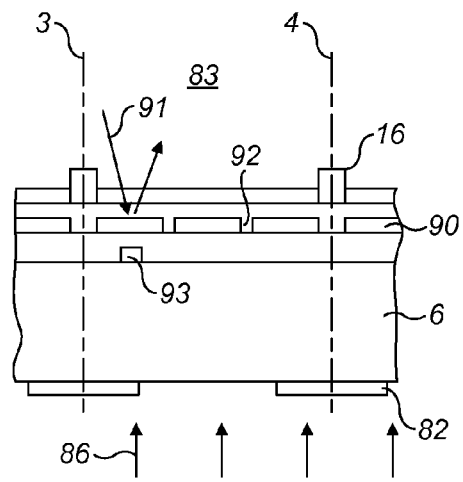

FIG. 5 shows a cross-section of an electrowetting element of a transflective display device. An electrode 90 operates as reflector for ambient light 91 incident from the viewing side 83. The electrode is provided with one or more holes 92 to transmit the light 86. The area of the holes may form a substantial fraction of the display region of the element, e.g. 50%. The one or more holes are preferably arranged near the centre of the display region to prevent light leakage from light transmitted through the walls 16 via the second support plate 6 back to the viewing side 83. The signal line 93 is arranged on the second support plate 6 in an area below the electrode 90 where it does not cover a hole 92.

In all embodiments the width of the signal lines should be made as small as possible to reduce reflection from the wall region.

The display device according to the invention may form part of a display apparatus. The display apparatus may include driver stages. The driver stages may be arranged on one of the support plates. The signal lines are connected to the outputs of the driver stages. The display apparatus may include a display driving system. The display driving system may comprise a display controller and a distributor.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A display device comprising a plurality of electrowetting elements having a first support plate and a second support plate, each electrowetting element comprising a space between the first support plate and the second support plate and including a first fluid and a second fluid immiscible with each other, each electrowetting element comprising walls arranged on the second support plate for confining the first fluid to the space of the electrowetting element, the walls of the electrowetting element covering a wall region of the second support plate and the walls enclosing a display region of the second support plate, each electrowetting element comprising an electrode arranged on the second support plate, the electrodes of the electrowetting elements being coupled to reflective, strip-shaped signal lines arranged on the second support plate, wherein a first area of the signal lines is arranged in the wall region and a second area of the signal lines is arranged in the display region, the first area being smaller than the second area.

2. A display device according to claim 1, wherein the electrode is arranged in the display region.

3. A display device according to claim 1, wherein the second area of the signal lines is substantially in an area of the second support plate where the electrode is arranged.

4. A display device according to claim 1, wherein a reflector is arranged in the display region.

5. A display device according to claim 4, wherein the electrode operates as reflector.

6. A display device according to claim 1, wherein the second area of the signal lines is arranged substantially in an area of the second support plate where the first fluid is contracted in a fluid configuration having an applied voltage.

7. A display device according to claim 1, wherein the first area is smaller than 0.2 times the second area.

8. A display device according to claim 1, wherein an absorbing layer is arranged on the second support plate at least in the wall region at a side opposite the walls.

9. A display device according to claim 1, wherein a further plate is arranged at a side of the second support plate opposite the walls, which further plate is an absorber for light transmitted through the second support plate.

10. A display device according to claim 1, wherein a reflecting layer is arranged at a side of the second support plate opposite the walls, for reflecting light transmitted through the second support plate in a direction away from a direction of incidence of the light.

11. A display device according to claim 1, wherein a layer in contact with the first fluid is arranged on the second support plate in at least part of the display region of the second support plate, the layer being more wettable to the first fluid than to the second fluid.

12. A display device according to claim 1, wherein the signal lines include gate lines and source lines.

13. A display device according to claim 12, wherein the display device is of an active matrix type.

14. A display apparatus including a display device according to claim 1 and driver stages having outputs, the signal lines being connected to the outputs.

15. A display apparatus according to claim 14, including a display driving system.

* * * * *